FIG. I

J. Wagensommer
INVENTOR.

J. Wagensommer
INVENTOR.

BY C. B. Barvin
PATENT ATTORNEY

J. Wagensommer
INVENTOR.

PATENT ATTORNEY

United States Patent Office

3,563,964
Patented Feb. 16, 1971

---

3,563,964
HIGH MOLECULAR WEIGHT ETHYLENE COPOLYMERS PRODUCED BY COORDINATION CATALYSTS CONTAINING ANHYDROUS HYDROGEN HALIDE
Joseph Wagensommer, Westfield, N.J., assignor to Esso Research and Engineering Company, a corporation of Delaware
Filed Dec. 23, 1965, Ser. No. 526,648
Int. Cl. C08f 15/40
U.S. Cl. 260—80.78            11 Claims

ABSTRACT OF THE DISCLOSURE

Elastomers having novel microstructures are prepared from ethylene and $C_3$–$C_{10}$ alpha-olefins polymerized in the presence of a Ziegler-type catalyst and anhydrous hydrogen halide.

---

Figure 1:
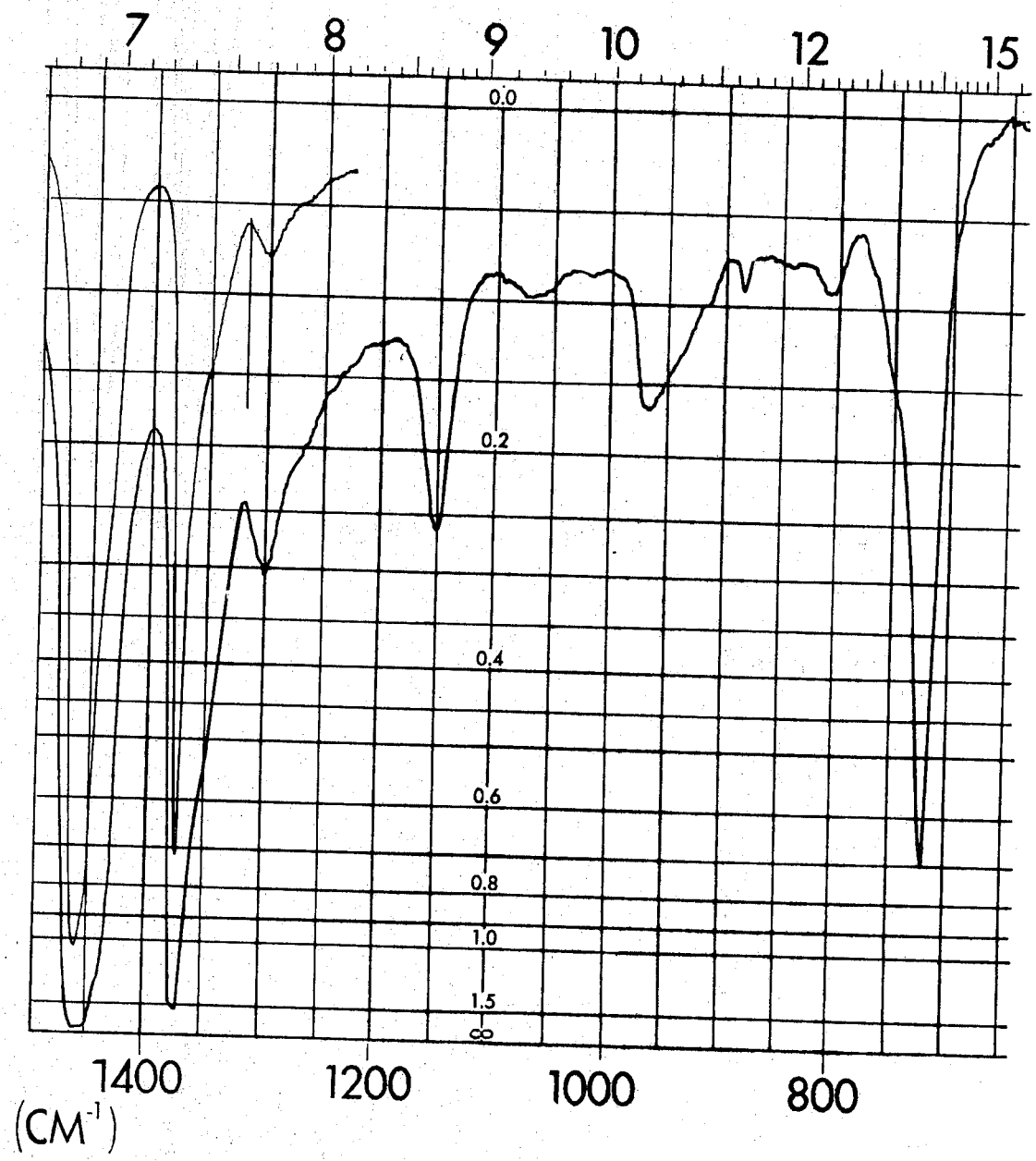

This invention relates to a process for making novel polymers having a particular microstructure as hereinlater defined more fully. In particular, it relates to elastomeric copolymers of ethylene and alpha-olefins, especially propylene, which have a high degree of head-to-head linkages in the microstructure and which evidence a high degree of crystallinity and to processes suitable for producing such novel elastomers.

It is known that ethylene and alpha-olefins, such as, propylene, can be copolymerized at relatively low temperatures and pressures by various species of the so-called Ziegler catalyst, i.e., a transition metal compound used in combination with metal alkyls to produce elastomers having quite different properties from natural rubber.

These copolymers when made under certain critical conditions and with certain specific catalyst species of the Ziegler type have a high degree of attributes of a good rubber. They are substantially free of crystallinity and this accounts for their high elasticity and resilience and resistance to becoming hard, stiff and brittle even at sub-zero temperatures.

In the conventional polymerization of ethylene with an alpha-olefin, e.g. propylene to make these ethylene/propylene rubbers, when the propylene combines with itself within the molecule, it forms head-to-tail linkages. By this is meant linkages which are illustrated in the following schematic formula:

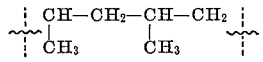

It has now been discovered and forms the essence of the invention that for the first time ethylene/propylene copolymers can be prepared which have a high dgree of head-to-head linkages. By head-to-head linkages, it is meant linkages of the type illustrated in the following schematic formula:

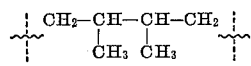

In its more generic aspects, i.e. when an alpha-olefin is employed the schematic formula can be expressed as

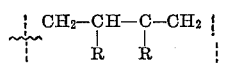

where R is a $C_1$ to $C_8$ alkyl radical. In general the polymers in the invention can have from 3 to 80, preferably 25 to 60, more preferably 25 to 50 and most preferably 30 to 50% of head-to-head linkages.

Also, some tail-to-tail linkages are formed. By tail-to-tail linkages, it is meant linkages of the type illustrated in the following schematic formula:

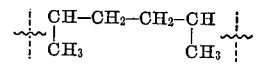

The ethylene-alpha-olefin copolymers of the present invention have a high degree of crystallinity, this is especially surprising in those ranges, i.e. where the molar ratio of ethylene and propylene are within the range of 35–65: 65–35. It is found that the ethylene-propylene copolymers may exhibit a degree of crystallinity up to about 25% and higher. The ethylene/propylene copolymers which exhibit especial advantageous utility have a degree of crystallinity which ranges from about 1% up to about 20%.

The polymers of the present invention should be differentiated from conventional block copolymers which consist of long-chained segments of widely differing polarity. Thus, contrary to the instance of block copolymers, where long sequences of two monomers follow one another along the main polymer chain graft copolymers where long sequences of one monomer are grafted on to the backbone of a second monomer type, the probability of finding long sequences of one monomer in the random copolymer of the instant invention is very small, except in certain isolated instances, which instances are ignored for the purpose of definition.

Thus, the ethylene-alpha-olefin copolymers, e.g. ethylene/propylene copolymers, having the desired microstructure and degree of crystallinity referred to above, may be described as crystalline-amorphous, low molecular weight, essentially unbranched, random copolymers with relatively small regions of ethylene or alpha-olefin, e.g., propylene, homopolymer sequences. These polymers are produced by a method which is necessarily employed and which is more fully described hereinafter.

With respect to the novel process of this invention, not only are polymers having novel microstructures produced but the process technique has the concomitant, highly desirable advantages of greatly increasing the rate of $C_3$ conversion and catalyst efficiency.

In general, the process comprises reacting from 2 to 98 wt. percent of ethylene with from 98 to 2 wt. percent of alpha-olefin, preferably propylene in the presence of a soluble species of Ziegler catalysts, preferably a catalyst prepared by activating $VCl_4$ or $VOCl_3$ with dialkyl aluminum chloride. Into the monomeric mixture is introduced anhydrous hydrogen halide including hydrogen fluoride, hydrogen chloride, hydrogen bromide or hydrogen iodide or mixtures thereof. The resultant product has a viscosity average molecular weight ($\overline{M}v$) of 20,000 to 300,000.

Unless otherwise specified, the term "molecular weight" as used herein means molecular weight weight based on viscosity measurement. The molecular weights indicated herein and in the claims hereof were estimated on the basis of viscosity measurement at 135° C. of solutions which contained 0.5 milligram of polymer per milliliter of decalin.

A summary of typical ranges of catalyst concentrations, hydrogen halide concentrations, process variables and monomer percents in the final compositions is as follows:

TABLE I

| | Preferred | More preferred | Most preferred |
|---|---|---|---|
| Catalyst composition, Al/v, molar ratio | 0.5-25 | 1-12 | 2-7 |
| Catalyst concentration in the solvent, p.p.m. by wt | 1-1,000 | 5-500 | 10-200 |
| Hydrogen halide concentration mole percent, based on the total moles of monomer feed | 0.001-10 | 0.01-5 | 0.2-2.0 |
| Process variables: | | | |
| Temperatures, ° C | 0-200 | 0-60 | 20-55 |
| Pressures, p.s.i.g | 0-2,000 | 0-300 | 0-100 |
| Reaction or contact time, mins | 1-300 | 3-60 | 10-35 |
| Percent of each component in the resulting elastomer: | | | |
| Wt. percent ethylene | 2-98 | 10-95 | 30-8 |
| Wt. percent propylene and/or other alpha-olefin | 98-2 | 5-9 | 20-70 |

It is the presence of the hydrogen halide in the reaction which causes the alpha-olefin, e.g. propylene to undergo considerable head-to-head addition rather than the usual head-to-tail addition. Conventional chain transfer agents taught by the art are inoperable for purposes of this invention when hydrogen halide is excluded from the system. These include inoperative chain transfer agents, such as carbon tetrachloride, chloroform and other alkyl halides particularly where the number of carbon atoms is between 1 and 5. It is found that these agents and hydrogen have no effect in affecting the microstructure of the resultant polymers nor do they beneficially affect the rate of polymer production.

In general, the soluble catalysts used in the process of the invention can be formed by mixing an organo-aluminum halide with various vanadium compounds. These vanadium compounds are then reacted with an aluminum alkyl compound in order to produce the final catalyst composition. In the preparation of the preferred catalyst class, the following description is pertinent.

About 0.05 to 10 moles, preferably 0.15 to 1.5 moles of vanadium compound are reacted per mole of aluminum alkyl compound.

The vanadium compound which is used in this invention is a vanadium oxyhalide, a vanadium oxyacetylacetonate or alkyl vanadate. The vanadium oxyhalide has the formula $VOX_3$ wherein X is a halogen having an atomic number of more than 17, i.e., chlorine, bromine, or iodine. The preferred vanadium oxyhalide is $VOCl_3$.

The vanadium oxyacetylacetonate has the formula $VOA_3$, where A is the acetylacetonate radical or a haloacetylacetonate radical, the halogen being any of chlorine, bromine, iodine, or fluorine. Examples of these compounds include vanadium oxytriacetylacetonate, vanadium oxytri(trihaloacetylacetonate), and vanadium oxytri (hexahaloacetylacetonate). Preferred of this group is vanadium oxytri(acetylacetonate).

The alkyl vanadate has the formula $VO(OR)_3$ where R is a $C_1$ to $C_{12}$ alkyl group, preferably a $C_2$ to $C_6$ alkyl group. Examples of alkyl vanadates are $VO(OCH_3)_3$, $VO(OC_2H_5)_3$, $VO(OC_4H_9)_3$, and $$VO(OC_8H_{17})_3$$

The preferred alkyl vanadate is $VO(OC_2H_5)_3$. The most preferred vanadium compound is $VOCl_3$ (vanadium oxychloride).

It is to be noted that insoluble catalysts such as vanadium trihalides particularly $VCl_3$ which are frequently used as a catalyst component for the copolymerization of alpha-olefins, have no use in this invention.

The present invention also contemplates the use of titanium compounds that can be reacted with a selected vanadium compound to produce a reaction product which is a complex as described in copending, commonly assigned application, Ser. No. 464,862, filed June 17, 1965 and now abandoned, which application is herein incorporated by reference in its entirety although so much of it as is necessary to understand which titanium catalyst species are usable in the present invention will be repeated. The titanium compounds have the general formula $Ti(OR)_4$ where R is a $C_1$ to $C_{12}$ alkyl radical. Preferably, R is a $C_2$ to $C_6$ alkyl radical. Thus, R may be a methyl, propyl, butyl, pentyl, isopentyl, octyl, hexyl group. Most preferably, R is a butyl group so that tetrabutyl titanate is the most preferred titanium compound. These titanium compounds are reacted with the vanadium compounds described herein excluding $VCl_4$ to produce a soluble complex. Generally, about 0.05 to 10 moles, preferably 0.15 to 1.5 moles of vanadium compound, are reacted per mole of titanium compound.

The alkyl aluminum compounds which are useful in this invention have the formula $R_mAlX_n$ wherein R is a $C_1$ to $C_{12}$, preferably $C_1$ to $C_8$, monovalent hydrocarbon radical, X is a halogen having an atomic number above 17 (i.e., Cl, Br, or I) or a $C_1$ to $C_{12}$, preferably $C_1$ to $C_8$, monovalent hydrocarbon radical or hydrogen, $m$ is an integer between 1 and 3 and the sum of $m$ plus $n$ is equal to 3.

Specific examples of R and/or X groups include methyl, ethyl, propyl, n-butyl, n-amyl, isoamyl, phenyl, tolyl, and cyclopentyl radicals. Even more preferred are the $C_1$ to $C_5$ alkyl groups such as ethyl and butyl groups. Most preferred is ethyl. The preferred halogen is chlorine.

Examples of suitable alkyl aluminum compounds include diethyl aluminum chloride, ethyl aluminum dichloride, and aluminum sesquichloride, aluminum trialkyl, aluminum monoalkyl dihalides and the like. Most preferred is diethyl aluminum chloride. Mixtures of alkyl aluminum compounds can also be suitably used. Examples of aluminum hydrides are diethyl aluminum hydride, ethyl aluminum dihydride and the like.

Ethylene and a $C_3$ to $C_{10}$ alpha-olefin can be copolymerized by the process of this invention. The alpha-olefin may be linear or branched where the branching occurs 3 or more carbon atoms from the double bond, and, while a single olefin is preferable, mixtures of these $C_3$ to $C_{10}$ olefins may be employed. Suitable examples of $C_3$ to $C_{10}$ alpha-olefins include: propylene, 1-butene, 1-pentene, 1-hexene, 1-heptene, 1-octene, 1-nonene, 1-decene, 4-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, 4,4-dimethyl-1-hexene, 5,6,6-trimethyl-1-heptene, 5,5-dimethyl-1-octene, 5-methyl-1-nonene and the like; particularly preferred herein is propylene. The concentration of $C_3$ to $C_{10}$ olefin monomer units in the final copolymer ranges is, in general, from about 2 to about 98 mole percent, preferably 5 to 90, most preferably 20 to 70 and especially preferred 35 to 65.

When propylene is employed as the comonomer i.e. with ethylene the present invention also contemplates the use of a $C_4$ to $C_{12}$ alpha-olefin and/or diolefin, polyolefin and the like which is copolymerized with ethylene and propylene in accordance with the above process to prepare terpolymers. These unsaturated monomers are also preferably linear, but may be branched where the branching occurs 3 or more carbon atoms from the double bond, and, while a single olefinic monomer is preferable, mixtures of these $C_4$ to $C_{12}$ olefinic monomers may be employed.

In preparing and using catalyst according to this invention, usually all steps should be carried out in the absence of oxygen, moisture, carbon dioxide or other harmful impurities. This end is readily accomplished by blanketing all of the raw materials including the catalyst components, monomers, and inert diluents with an inert gas such as dry nitrogen or argon. Preferably, all materials are purified, e.g., by drying, distillation, etc., prior to their use.

The conditions as hereinbefore set forth, at which the polymerization reaction is carried out can vary over a wide range. The reaction vessel can be constructed of any material that is inert to the reactants and diluents used, and is capable of withstanding the operating pressures. Reaction vessels made of glass, stainless steel and glass-lined steel are quite satisfactory. Details of the polymerization process have been generally described in the art. See, for example, copending application Ser. No. 334,938, now Pat. No. 3,438,951.

Where the copolymer has no unsaturation, i.e., does not contain a diolefin monomer, it may be cured with the use of certain free radical generators such as organic peroxides, e.g., dicumyl peroxide, or selected haloaliphatic compounds, e.g., octachlorocyclopentene. Where the copolymer contains unsaturation, conventional sulfur cures are possible.

Various solvents may be used in the practice of this invention and they include aliphatic, naphthenic, aromatic, and halogenated hydrocarbon solvents, or an excess of the higher alpha-olefin such as propylene may be used. Examples of solvents include n-hexane, heptane, propane, cyclohexane, toluene, xylenes, tetrachloroethylene, decalin and chlorobenzenes, preferably, n-hexane.

It is essential to note that the polymerization reaction employed to prepare the copolymers of this invention is controlled by the use of a third catalyst component, specifically, hydrogen halide, to give the desired copolymer product. The criticality of such use is evidenced by comparison of the infrared spectra of copolymers prepared in runs which do not utilize hydrogen halide with runs which do utilize hydrogen halide. On comparison it is observed that the copolymers prepared using hydrogen halide had absorption peaks at about 8.95 and 10.0 microns which indicate head-to-head sequences. The head-to-tail propylene sequences on the other hand resulted in absorption peaks at 8.7 microns. The percentage of the head-to-head sequences present in the total polymer was calculated by means of I.R. data in a manner hereinafter set forth more fully and the loss of head-to-tail propylene sequences was measured by the absorption at 8.7 microns. As mentioned, the range of head-to-head linkages in the polymers of the invention is from about 3% to 80% of the total alpha-olefin present, the remainder of the linkages generally comprising olefin, e.g. ethylene, propylene, etc., random copolymer sequences, as well as some homopolymer sequences.

With regard to the degree of crystallinity of the copolymers utilized in the present invention, it was found that two independent techniques employed to determine same led to unexpectedly good experimental agreement. The two methods utilized were X-ray diffraction and differential thermal analysis.

In determining the degree of crystallinity by the X-ray diffraction method, the relative amounts of crystalline and amorphous material in the sample, are calculated be resolving the contributions of the two types of structure from the X-ray diffraction pattern. When ascertaining the degree of crystallinity, the determination is usually based on comparison of the areas of the respective peaks defined by the various scattering envelope of crystalline and amorphous segments. Other methods, such as comparison of peak height may be used, however. With proper attention to experimental detail, the X-ray diffraction method provides one of the fundamental measures of crystallinity in polymers.

In differential thermal analysis, the sample and an inert reference substance, undergoing no thermal transitions in the temperature range of interest, are heated at exactly the same rate, e.g., 1–2° C. per minute, in a controlled-temperature bath. The temperature difference between sample and references measured and plotted as a function of sample temperature. The temperature difference is final only when heat is being evolved or absorbed because exothermic or endothermic activity in the sample, or when the heat capacity of the sample is changing abruptly. Since the temperature difference is directly proportional to the heat capacity, the curves resemble specifically heat curves but are inverted because, by convention, heat evolution is registered as an upward peak and heat adsorption as a downward peak.

Accordingly, X-ray diffraction patterns and differential thermal analysis indicate a degree of crystallinity up to about 25% and generally a degree of crystallinity within the range of about 1 to about 20% in the copolymers of the instant invention. This range of crystallinities is indeed surprising inasmuch as copolymers exhibiting a maximum of amorphous spectra and essentially an absence of crystalline spectra would be expected from the teachings of the prior art. Thus, in view of relatively high porpylene content employed in the preparation of such copolymers, as well as the catalyst utilized, it would have been expected that the gross low molecular weight copolymer product would exhibit a substantially complete amorphous spectrum rather than the degrees of crystallinity obtained herein. As hereinlater supported by data, the copolymers which exhibit a degree of crystallinity in accordance with the present invention attain the superior viscosity index improvement which is not attained by copolymers not exhibiting the microstructure or crystallinity of the copolymers herein.

With regard to the final rubber produced by the instant invention, a variety of oils, carbon blacks, clays and silicas may be used as filler for the rubbers produced by this invention. The carbon blacks which are useful include SAF, SRF, HAF, FEF, and MPC blacks, all of which are commercially available. The amount of carbon black used can be from 0 to 300 parts by weight, but preferably 0 to 200 parts per 100 parts of elastomer is used. From 0 to 250 parts by weight of oil can also be added to obtain the desired balance of physical and processing properties in the final compound.

A very large part of the ethylene/propylene rubbers produced are used for blending with other rubber and plastic compounds since they impart to these compounds properties which otherwise would be lacking. This is a common expedient in the rubber and plastic industry to try to balance out the bad properties of one type of polymer with the good properties of another so that a resulting blend will have a minimum of bad properties and a maximum of good properties. The rubbers are oftentimes blended with polymers primarily to improve the latter's low temperature impact properties. See, for example, U.S. 3,036,987, 3,200,173 and Canadian 642,239.

Polypropylene is a plastic that is noted for its poor low temperature impact properties and commonly elastomers such as ethylene/propylene rubber are blended with it in order to improve this property. When this blending is carried out, some of the other properties of the polypropylene tend to be effected and, therefore, the choice of elastomers is extremely critical in order to overcome the undesirable properties of the polypropylene without detracting from the good properties. It has been found that the ethylene/propylene rubber produced by the process of this invention which has a novel microstructure imparts excellent properties to a composition comprising a blend of polypropylene and ethylene/propylene rubber.

The ethylene copolymers produced by the present invention are found to have excellent potency as V.I. improvers etc.

The invention is further illustrated by the following examples.

EXAMPLE 1

A series of copolymerizations of ethylene with propylene were carried out in a one gallon stirred, stainless steel autoclave operated at 60 p.s.i.g. pressure. The catalyst system used was composed of various species of vanadium compounds with diethyl aluminum chloride, which catalyst was used in amounts of approximately 0.2 wt. percent in diluent based on diluent weight. The operating conditions and the properties of the polymer produced from each run are summarized in Table I following.

TABLE I.—PREPARATION OF POLYMERS WITH ANHYDROUS HYDROGEN HALIDE

| | Temp. °C. | Res. time, min. | Monomer feed g./100 g. S.[a] | Monomer feed $C_2$, wt. percent | Catalyst feed g./ 100 g. S. | Al/V, molar ratio | Diene feed DCPD, g./100 g. S. | HCl feed [b] | Rate of copolymerization g./hr. | Catalyst efficiency g./g. V |
|---|---|---|---|---|---|---|---|---|---|---|
| Run No.: | | | | | | | | | | |
| A | 38 | 15 | 7.0 | 22 | 0.008 | 3.0 | | 0 | 318 | 398 |
| B | 38 | 15 | 7.0 | 22 | 0.008 | 3.0 | | 0.40 | 385 | 482 |
| C | 38 | 15 | 8.0 | 20 | 0.006 | 4.0 | | 0 | 309 | 516 |
| D | 38 | 15 | 8.0 | 20 | 0.006 | 4.0 | | 0.15 | 437 | 728 |
| E | 38 | 15 | 9.0 | 34 | 0.004 | 5.0 | | 0 | 438 | 1,095 |
| F | 38 | 15 | 9.0 | 34 | 0.004 | 5.0 | | 0.27 | 526 | 1,315 |
| G | 38 | 15 | 10.0 | 24 | 0.0063 | 7.0 | 0.255 | 0 | 323 | 512 |
| H | 38 | 15 | 10.0 | 24 | 0.0063 | 7.0 | 0.255 | 0.79 | 341 | 542 |
| I [e] | 35 | 13 | 11.0 | 31.9 | 0.020 | 5.1 | | 1.2 | 890 | 445 |
| J | 32 | 13 | 14.0 | | 0.012 | 5.0 | | 0.34 | 998 | 820 |

| | Conversion $C_2$, wt. percent | Conversion $C_3$, wt. percent | Copolymer composition $C_2$ wt. percent | Inherent viscosity [c] | Viscosity, avg. mol. wt. ($10^{-3}$) | Increase in Catalyst Efficiency percent | Increase in $C_3$, Conc. percent | Catalyst system used |
|---|---|---|---|---|---|---|---|---|
| Run No.: | | | | | | | | |
| A | 88.4 | 33.3 | 42.8 | 3.75 | 290 | | | ⎫ |
| B | [d] 95 | 37 | [f] 38.0 | 1.35 | 77 | 21 | 11 | ⎬ $VOCl_3Et_2AlCl$ |
| C | 83.8 | 27.3 | 43.4 | 4.05 | 320 | | | ⎭ |
| D | [d] 95 | 44.5 | [f] 34.7 | 1.30 | 75 | 41 | 63 | ⎫ |
| E | 86.7 | 29.1 | 60.6 | 4.10 | 280 | | | ⎬ $VCl_4Et_2AlCl$ |
| F | [d] 95 | 40 | [f] 55.2 | 1.67 | 85 | 20 | 37 | ⎭ |
| G | 87.6 | 14.9 | 63.0 | 2.65 | 150 | | | ⎫ $VCl_4Et_2AlCl$ |
| H | 89.2 | 16.8 | 62.7 | 2.30 | 122 | 6 | 11 | ⎭ |
| I [e] | [d] 95 | 74.5 | | | | | | $VOCl_3Et_2AlCl$—HBr |
| J | [d] 97 | 70 | | | | | | $VCl_4Et_2AlCl$ |

[a] All runs were made at 60 p.s.i.g. pressure in normal hexane solvent.
[b] Anhydrous HCl feed, wt. percent based on total monomer feed.
[c] Decalin viscosity at 135° C.
[d] Assumed ethylene conversion.
[e] Anhydrous HBr feed, wt. percent based on total monomer feed.
[f] Calculated ethylene.

NOTE.—Symbols and abbreviations: g=grams; Res.=Residence; S.=Solvent; DCPD=Dicyclopentadiene.

From the above tabulated data it can be seen that the use of the hydrogen halide results in a considerable increase in the rate of copolymerization, percent of both $C_2$ and $C_3$ conversion, catalyst efficiency and a decrease in the inherent viscosity of the elastomer produced. Note that Run I which used HBr gave results equivalent to those obtained using HCl. It should also be observed that terpolymers could be satisfactorily prepared with most dienes such as dicyclopentadiene, but norbornylene type compounds as termonomers cannot be used to prepare copolymers using hydrogen halide.

Figure 2:
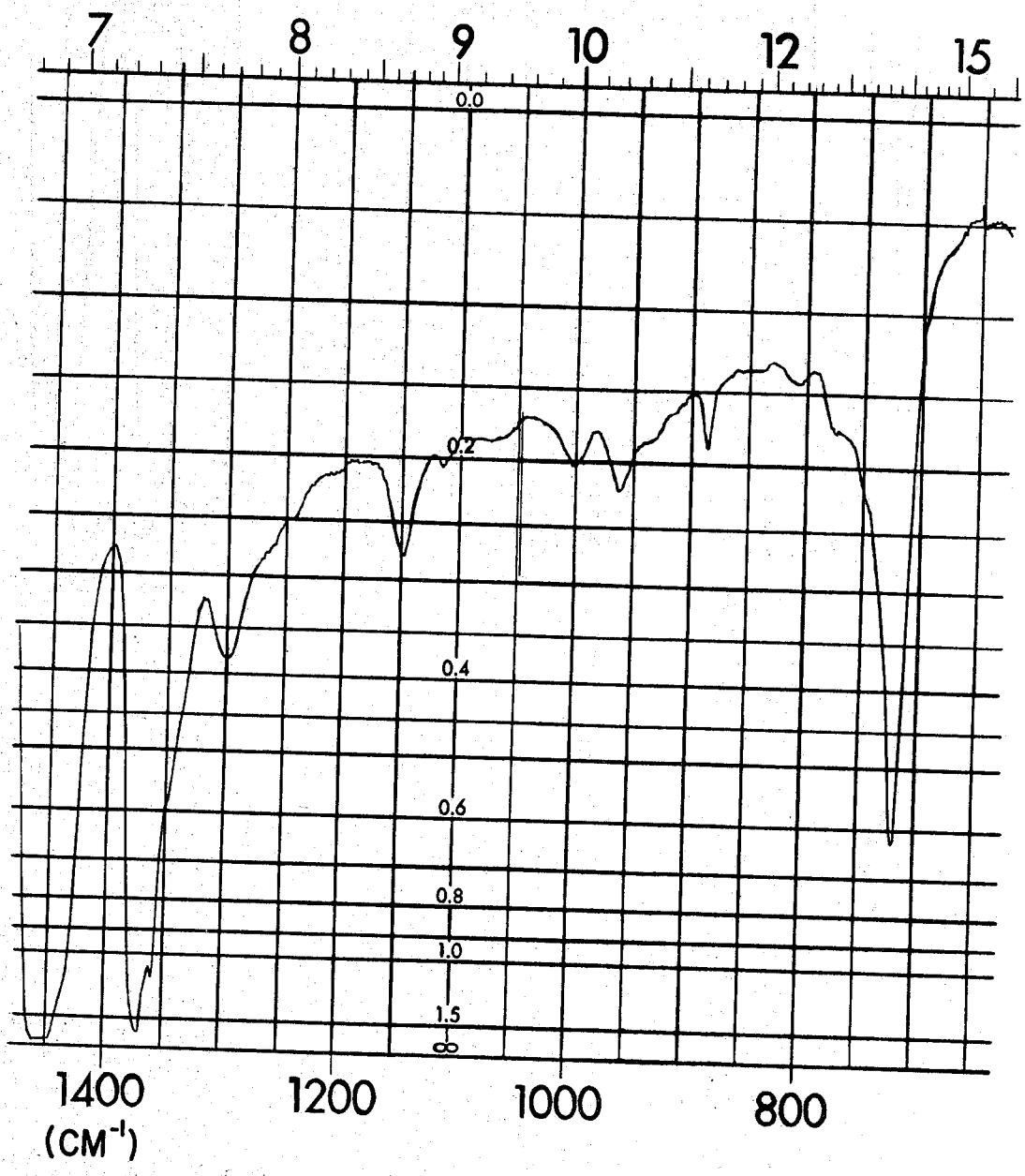

Infrared spectra of the copolymers obtained in Run E which used no hydrogen halide and Run F which did utilize hydrogen halide were prepared for comparison purposes. The infrared spectra for Run E is shown in FIG. 1 of the drawings and that of Run F is shown in FIG. 2 of the drawings. In examining these infrared spectra, it can be seen that FIG. 2 has a weak peak at about 8.95 and a strong peak at about 10.0 microns which indicate head-to-head sequences. The percentage of these sequences present in the total polymer can be calculated by means of I.R. spectra.

The percentage of ethylene content may be determined as follows: thin films of the polymers are cast from dilute solutions (1% in tetrachloroethylene, benzene or heptane) or to NaCl plates. The infrared spectrum is obtained. The log ratio of the 1150 cm.$^{-1}$ (8.7μ) methyl vibration to that of the 720 cm.$^{-1}$ (13.9μ) methylene vibration is obtained. The value will vary depending upon the percent propylene in the ethylene propylene copolymer. A plot of this log ratio is then made against percentage composition.

The percent $C_2$ of a particular polymer may be obtained from tagged $C_{14}$ experiments, utilizing labeled ethylene or propylene, to relate the actual $C_2$ content to the log ratio.

If extinction coefficients are known, one may use quantitative solutions for infrared analysis and obtain the plot in a like manner.

EXAMPLE 2

This example serves to illustrate a method of calculating the estimated head-to-head linkages contained in an ethylene/propylene copolymer produced by the process of the present invention. The method employed is that described in "Spectroscopic Analysis of Ethylene-Propylene Copolymers" by Harry V. Drushel and Frank A. Iddings, Analytical Chemistry, 35, 28, 1963).

In this example, a sample was prepared by evaporating a solution of the polymer (reactor cement) on a suitable KBr pellet. A NaCl plate may be employed instead of the KBr pellet or, if desired, the sample may be prepared by pressing a thin film with a hydraulic press.

An infrared spectrum of the prepared sample film was recorded between 5000 cm.$^{-1}$ (2μ) and 650 cm.$^{1-}$ (15μ). The ratio of the band intensities at 1150 cm.$^{-1}$ (8.7μ) and 720 cm.$^{-1}$ (13.9μ) was used for the analysis. Adsorption at 1150 cm.$^{-1}$ is derived from the propylene units (methyl wagging frequency) and adsorption at 720 cm.$^{-1}$ is derived from ethylene units (methyl chain rocking frequency). The thus obtained ratios were applied to a calibration curve prepared from $C_{14}$—labeled standard copolymer samples and it was determined that the sample being assayed contained 51% ethylene and 7% propylene having head-to-tail linkage.

The amount of head-to-head propylene linkage may be represented as the remainder from the total linkages, i.e. 100%, after the amount of ethylene linkage, i.e. 51%, and head-to-tail propylene, i.e. 7%, have been substracted therefrom. In other words, the percentage of head-to-head propylene linkage equals 100% minus (51% $C_2$ plus 7% $C_3$ H–T–T) or 42% propylene head-to-head linkage.

It is essential to note that the polymers of this invention contain a significant quantity of head-to-head linkages. From the examples accomplished, it was determined that the average appears to be about 30 to 50% head-to-head linkages. In this connection it is appropriate to mention the article by Schooten, Duck and Berkenbosch appearing in "Polymer," 2, 357 (1961), entitled "The Constitution of Ethylene/Propylene Copolymers" which points out that copolymers of ethylene and propylene produced by vanadium-containing catalyst would show a minor amount of head-to-head polymerization. However, the head-to-head polymerization observed by these authors was only that occurring with an ethylene unit appearing between the head-to-head polymerization such as is illustrated by the following:

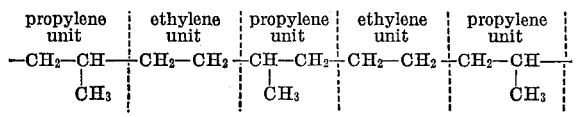

This is the configuration necessary for the observance of (CH₂)₂ and (CH₂)₄ sequences. No sequences of head-to-head propylene linkages of the following nature which were discovered and described herein were found:

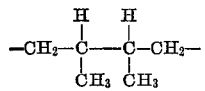

These give I.R. peaks at about 8.95 microns and about 10.0 microns which have never been observed before applicant found them. The peaks at about 8.95 microns are weaker than the peaks at about 10.0 microns.

In a later article by Van Schooten & Mostert appearing in Polymer, vol. 4, page 135 et seq. (1963), the authors point out that in pure polypropylene a maximum of head-to-head linkages of only 5 to 15 percent was obtained in the amorphous fraction. For pure polypropylene every head-to-head linkage must be accompanied by a tail-to-tail linkage.

The I.R. absorption spectra found by these authors between 8.8 to 9.0 which is characteristic of the

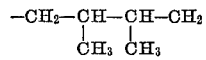

structure was found by them but it was not sharp at all indicating at best that only minimal head-to-head linkages as defined herein were obtained, explainable by the fact that isolated ethylene groups appear frequently between two head-to-head oriented propylene groups.

In the present invention the preponderance of head-to-head linkages occur directly without intervening ethylene groups leading to a copolymer with a much higher proportion of direct head-to-head linkages than has ever been produced before.

It is also to be noted that when VOCl₃ is used in the system of the present invention without HCl there are no peaks at about 8.95 microns and about 10.0 microns which would indicate head-to-head linkages. See FIG. 1. These peaks only occur after the use of HCl. See FIG. 2.

EXAMPLE 3

In order to demonstrate that compounds known to the art as chain-terminating agents are not operable for the purposes of this invention, a series of copolymerizations of ethylene with propylene were carried out in a one gallon stirred stainless steel autoclave operated at 60 p.si.g. pressure. The catalyst system used was composed of various species of vanadium compounds with diethyl aluminum chloride, which catalyst was used in amounts of approximately 0.2 wt. percent in diluent based on diluent weight. The operating conditions and the properties of the polymer produced from each run are summarized in Table II following:

TABLE II

| Run No. | Temp. °C. | Res. time, min. | Monomer feed g./100 g. S | Monomer feed C₂, wt. percent | Catalyst feed g./100 g. S. | Al/V, molar ratio | Diene feed | Chain terminating agent | Rate of copolymerization, g./hr. | Catalyst efficiency g./g. V |
|---|---|---|---|---|---|---|---|---|---|---|
| K | 38 | 9 | 11.1 | 22 | 0.006 | 6.0 | | 0 | 663 | 740 |
| L | 38 | 9 | 11.1 | 22 | 0.006 | 6.0 | | ᵃ4 | 680 | 755 |
| M | 38 | 14 | 9.0 | 30 | 0.006 | 5.5 | 0.18 | | 418 | 698 |
| N | 38 | 14 | 9.0 | 30 | 0.006 | 5.5 | 0.18 | (ᵃ) | 368 | 613 |
| O | 38 | 14 | 9.2 | 26 | 0.0065 | 4.3 | 0.19 | | 1,112 | 570 |
| P | 38 | 14 | 9.2 | 26 | 0.0065 | 4.3 | 0.19 | (ᵇ) | 940 | 482 |

| Run No. | Conversion C₂, wt. percent | Conversion C₃, wt. percent | Copolymer composition C₂, mole percent | Copolymer composition C₂, wt. percent | Inherent viscosity | M̄ᵥ × 10⁻³ | Mooney viscosity 212° F. 1–8′ | Mooney viscosity 260° F. 1+8′ | Catalyst | Catalyst system used |
|---|---|---|---|---|---|---|---|---|---|---|
| K | 91 | 25.5 | 60.1 | 50.1 | 3.0 | 198 | 62 | | Control run | VCl₄ |
| L | 92 | 26.4 | 59.6 | 49.6 | 2.2 | 130 | 36 | | With hydrogen | Et₂AlCl |
| M | 85 | 30 | | 54.9 | 3.9 | 266 | | 75 | Control run | VCl₄ |
| N | 84.5 | 22 | | 62.0 | 2.9 | 170 | | 52 | With 1-butene | Et₂AlCl |
| O | 93 | 22 | | 60.0 | 3.4 | | | 50 | Control run | VOCl₃/Ti |
| P | 90 | 14 | | 69.2 | 3.3 | | | 41 | With diisobutyl amine | (OC₄)₄/Et₂AlCl |

ᵃ H₂, 4 p.p.m. of solvent.
ᵇ Butene-1 feed; 2.0 g./100 g. solvent.
ᶜ Diisobutylamine feed, 0.00086 g./100 g. solvent.

NOTE.—Symbols and abbreviations: g.=grams; Res.=Residence; S.=Solvent.

As can be seen from the above Table II, three pairs of runs were carried out, each pair consisting of a control run and a run with a chain-terminating agent. The chain-terminating agents were hydrogen, butene-1 and diisobutylamine. As can be seen from the above runs, the addition of the chain-terminating agent resulted in no increase in conversion percentage or in rate of polymerization except for an insignificant amount for the hydrogen run. Moreover, in the butene-1 and the diisobutylamine runs, the conversion rates and the rate of conversions were less than for the control runs.

Figure 3:
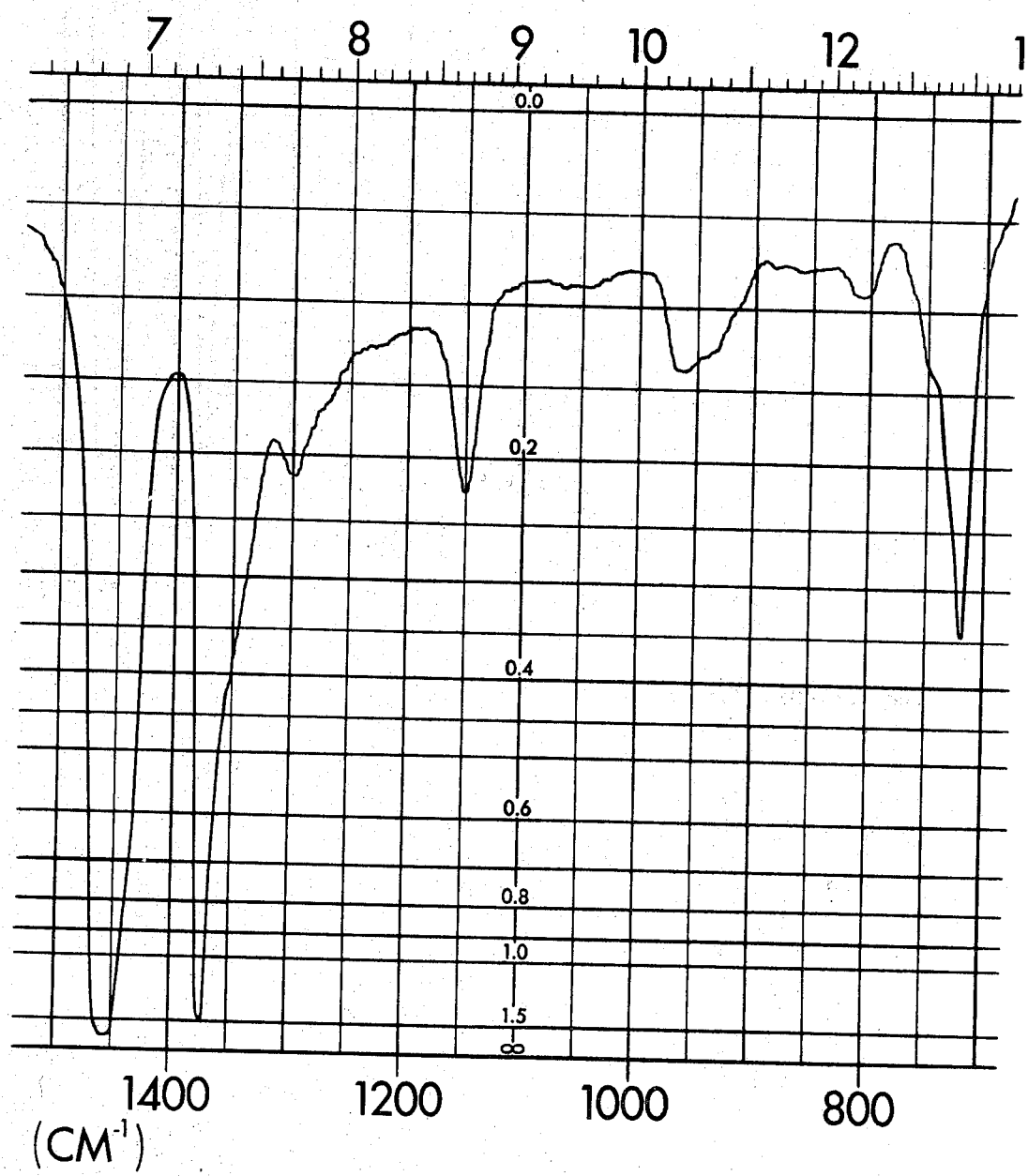

An infrared spectra for the hydrogen run identical to Run L but using 24 p.p.m. H₂ based on solvent was prepared and is shown in FIG. 3 of the drawing. It can be seen from this FIG. 3 that peaks at 8.95 microns and 10.0 microns characteristic of the head-to-head configurations are not present when hydrogen is used as a chain-terminating agent. Moreover, in this process, hydrogen has an additional disadvantage since it tends to make the polymer soupy since it reduces the viscosity so drastically. Extremely low quantities of H₂ are conventionally used, i.e., in the order of 2–50 p.p.m. based on solvent and even these low amounts tend to make the polymer undesirably soupy. This disadvantage is not present when halogen halide is used.

EXAMPLE 4

Various elastomers were blended with a commercial grade polypropylene to produce compositions having differing properties. The blends and their properties are summarized below in Table III.

TABLE III

| Composition | A | B¹ | C² |
|---|---|---|---|
| Elastomer | (³) | EPR | EPR |
| Elastomer I.V. | ~2.1 | 1.65 | 1.50 |
| Elastomer concentration wt. percent | 10 | 10 | 10 |
| Film properties: | | | |
| Gloss | 14.5 | 70.1 | 84.2 |
| Haze | 37.5 | 2.6 | 1.7 |
| Stiffness, p.s.i. | 86,700 | 85,400 | 86,600 |

¹ H₂ used as chain transfer agent. See Note.
² HCl used according to the invention. See Note.
³ Commercial grade EPT.
Identical runs except for the use of H₂ or HCl.
Note.—The properties of primary importance for films are haze, gloss, impact strength and stiffness. Targets are: ~90 gloss, >1.0 haze, >0.035 impact and ~90,000 stiffness.

It can be seen from the above Table III that the copolymer produced using the HCl in accordance with this invention resulted in a blended composition having the best overall properties with respect to approaching target commercial specifications. It gave particularly significant results in the gloss and haze properties which are of extreme importance for film grade resins. It also can be used to make substantially 100% homopolymers of $C_2$–$C_8$ alpha-olefins having a high degree of head-to-head linkages in the microstructure where crystallinity is not desired.

EXAMPLE 5

A number of continuous runs were effected in a manner according to Example 1 in order to illustrate the capability of the process of the present invention to prepare copolymers which exhibit a high degree of crystallinity. The copolymers utilized in all of the runs set forth in the following Table I were prepared in a manner similar to that set forth in the preceding disclosure and in the identified example. The catalyst system, as well as the ethylene content of the resulting copolymer are set forth in Table IV.

In this example, the ethylene-propylene copolymers were examined for their degrees of crystallinity by X-ray diffraction. The procedure utilized was similar to that of Weidinger and Hermans, Makromolekular Chem., 50, 98 (1961). The method of determining the crystalline fraction in the ethylene/propylene polymer consisted of:

(1) Obtaining a diffractogram of the ethylene/propylene copolymer sample.

(2) Measuring the amorphous and crystalline areas of the diffractogram.

(3) Calculating the percent crystallinity from these two measurements.

The method is based upon taking a series of diffractograms of ethylene/propylene copolymer samples that vary in crystallinity. The data is normalized to the same adsorbance. A plot of the normalized crystalline area versus the normalized amorphous gives a linear relation between the two quantities. This allows the calculation of the crystalline and amorphous areas.

The X-ray crystallinity data as determined by X-ray diffraction using the method hereinbefore set forth are presented in Table IV.

TABLE IV

| Catalyst system | | Calculated ethylene content wt. percent | Percent crystallinity (X-ray diffraction) |
|---|---|---|---|
| Run No.: | | | |
| Q | $VCl_4 \cdot AlEt_2 \cdot HBr$ | 40.3 | 5.7 |
| R | $VOCl_3AlEt_2Cl \cdot HBr$ | 38.8 | 8.9 |
| S | $VOCl_3 \cdot AlEt_2Cl \cdot HCl$ | 35.3 | 12.1 |
| T | $VOCl_3 \cdot AlEt_2Cl \cdot HCl$ | 40.8 | 18.6 |
| U | $VOCl_3 \cdot AlEt_2Cl \cdot HCl$ | 41.7 | 19.9 |

From the data of Table IV it is readily apparent that the process of the present invention produces ethylene/propylene copolymers having a surprisingly high degree of crystallinity. This is especially noteworthy in view of the range of ethylene to propylene ratios of the samples tested.

Although the invention has been described with some degree of particularity, it will be understood that variations and modifications can be made therein without departing from the spirit of the invention as hereinafter claimed.

What is claimed is:

1. A novel polymeric composition comprising a copolymer of ethylene and a $C_3$ to $C_{10}$ alpha-olefin wherein from about 3% to about 80% of the alpha-olefin molecules are linked together in a head-to-head manner which can be represented structurally as:

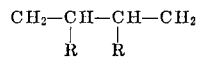

wherein R represents a $C_1$ to $C_8$ alkyl substituent; said copolymer having a viscosity average molecular weight of 20,000 to 300,000 and a degree of crystallinity up to about 25%.

2. A composition according to claim 1 wherein said copolymer contains from about 10 to about 95% by weight ethylene.

3. A composition according to claim 1 wherein said polymeric composition contains at least one additional $C_4$ to $C_{12}$ olefin comonomer.

4. A composition according to claim 1 wherein said alpha-olefin is propylene.

5. A composition according to claim 1 wherein said percentage of head-to-head linkages is from about 30 to about 50%.

6. The novel polymeric composition of claim 4 wherein the infrared spectra of said copolymer shows peaks at about 8.95 $\mu$ and about 10.0 $\mu$.

7. A process for preparing a polymeric composition according to claim 1 which comprises in combination:

(1) introducing a mixture of from 2 to 98 wt. percent ethylene and from 98 to 2 wt. percent of a $C_3$ to $C_{10}$ alpha-olefin into a reaction zone, (2) polymerizing said mixture at a temperature of 0 to 200° C., a pressure of 0 to 2,000 p.s.i.g. for a time of 1 to 300 minutes in the presence of;

(a) an organic diluent (b) 0.001 to 10 mole percent of anhydrous hydrogen halide based on total moles of monomer feed, and (c) a vanadium-containing catalyst soluble in said diluent with an alkyl aluminum catalyst having the formula $R_mAlX_n$ wherein R is a $C_1$ to $C_{12}$, preferably $C_1$ to $C_8$, monovalent hydrocarbon radical, X is a halogen having an atomic number 17 and up or a $C_1$ to $C_{12}$, preferably $C_1$ to $C_8$, monovalent hydrocarbon radical or hydrogen, $m$ is an integer between 1 and 3 and the sum of $m$ plus $n$ is equal to 3 wherein said catalyst concentration is from 1–1,000 p.p.m. by weight and the ratio of Al/V is 0.5–25.

8. A process according to claim 7 wherein said alpha-olefin is propylene and said hydrogen halide is HCl.

9. A process according to claim 8 wherein said alpha-olefin is propylene and said hydrogen halide is HBr.

10. A method according to claim 9 wherein said alpha-olefin is propylene and said vanadium compound is $VCl_4$, said aluminum compound is diethyl aluminum chloride and said hydrogen halide is HCl or HBr.

11. A method according to claim 7 wherein said vanadium compound is $VOCl_3$.

References Cited

UNITED STATES PATENTS

| 3,161,628 | 12/1964 | Dost | 260—94.9 |
| 3,271,381 | 9/1966 | Andersen | 260—94.9 |
| 3,389,087 | 6/1968 | Kresge et al. | 252—59 |

JOSEPH L. SCHOFER, Primary Examiner

R. S. BENJAMIN, Assistant Examiner

U.S. Cl. X.R.

260—88.2